(12) United States Patent
Fouarge et al.

(10) Patent No.: US 7,985,378 B2
(45) Date of Patent: Jul. 26, 2011

(54) FLUSHING IN A MULTIPLE LOOP REACTOR

(75) Inventors: Louis Fouarge, Dilbeek (BE); Daan Dewachter, Mechelen (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 253 days.

(21) Appl. No.: 12/295,255

(22) PCT Filed: Mar. 27, 2007

(86) PCT No.: PCT/EP2007/052908
§ 371 (c)(1),
(2), (4) Date: May 18, 2009

(87) PCT Pub. No.: WO2007/113167
PCT Pub. Date: Oct. 11, 2007

(65) Prior Publication Data
US 2009/0246092 A1 Oct. 1, 2009

(30) Foreign Application Priority Data
Mar. 30, 2006 (EP) .................................. 06112008

(51) Int. Cl.
*B01J 19/18* (2006.01)
*F16K 17/00* (2006.01)

(52) U.S. Cl. ....... 422/132; 422/131; 261/43; 137/15.17; 137/68.23; 137/204; 137/315.04; 137/315.05; 137/613; 137/797

(58) Field of Classification Search .................. 422/131, 422/132; 261/43; 137/15.17, 68.23, 204, 137/315.04, 315.05, 613, 797
See application file for complete search history.

(56) References Cited

U.S. PATENT DOCUMENTS

| | | | | |
|---|---|---|---|---|
| 2,926,023 A * | 2/1960 | Kraus | ..................... | 280/124.106 |
| 3,167,395 A * | 1/1965 | Marshall et al. | .............. | 422/131 |
| 4,186,776 A * | 2/1980 | Burton | ............................. | 138/30 |
| 4,613,484 A * | 9/1986 | Ayres et al. | ..................... | 422/132 |
| 4,705,065 A * | 11/1987 | McNeely et al. | .......... | 137/484.6 |
| 5,088,515 A * | 2/1992 | Kamen | ....................... | 137/15.17 |
| 6,223,790 B1* | 5/2001 | Viken | .............................. | 141/98 |
| 6,239,235 B1* | 5/2001 | Hottovy et al. | .................. | 526/64 |

* cited by examiner

*Primary Examiner* — Walter D Griffin
*Assistant Examiner* — Huy-Tram Nguyen

(57) ABSTRACT

The present invention discloses multiple loop reactor wherein one of the settling legs transferring polymer product from one loop to a further loop can be taken out of service or re-opened without interfering with the operation of said multiple loop reactor.

6 Claims, 2 Drawing Sheets

FLUSHING IN A MULTIPLE LOOP REACTOR

CROSS-REFERENCE TO RELATED APPLICATIONS

This application claims the benefit of PCT/EP2007/052908, filed Mar. 27, 2007, which claims the benefit of European Patent Application 06112008.5, filed on Mar. 30, 2006.

The present invention relates to a multiple loop reactor wherein one of the settling legs transferring polymer product from one loop to a further loop can be taken out of service or re-opened without interfering with the operation of said multiple loop reactor.

High density polyethylene (HDPE) was first produced by addition polymerisation carried out in a liquid that was a solvent for the resulting polymer. That method was rapidly replaced by polymerisation under slurry conditions according to Ziegler or Phillips. More specifically slurry polymerisation was carried out continuously in a pipe loop reactor. A polymerisation effluent is formed which is a slurry of particulate polymer solids suspended in a liquid medium, ordinarily the reaction diluent and unreacted monomer (see for example U.S. Pat. No. 2,825,721). It is desirable to separate the polymer and the liquid medium comprising an inert diluent and unreacted monomers without exposing the liquid medium to contamination so that said liquid medium can be recycled to the polymerisation zone with minimal or no purification. As described in U.S. Pat. No. 3,152,872, a slurry of polymer and the liquid medium is collected in one or more settling legs of the slurry loop reactor from which the slurry is periodically discharged to a flash chamber thus operating in a batchwise manner.

The mixture is flashed in order to remove the liquid medium from the polymer. It is afterwards necessary to recompress the vaporized polymerisation diluent to condense it to a liquid form prior to recycling it as liquid diluent to the polymerisation zone after purification if necessary.

Settling legs are typically required to improve the polymer concentration in the slurry extracted from the reactor; they present however several problems as they impose a batch technique onto a continuous process.

EP-A-0,891,990 and U.S. Pat. No. 6,204,344 disclose two methods for decreasing the discontinuous behaviour of the reactor and thereby for increasing the solids concentration (EP-A-0,891,990). One method consists in replacing the discontinuous operation of the settling legs by a continuous retrieval of enriched slurry. Another method consists in using a more aggressive circulation pump (U.S. Pat. No. 6,204,344).

More recently, EP-A-1410843 has disclosed a slurry loop reactor comprising on one of the loops a by-pass line connecting two points of the same loop by an alternate route having a different transit time than that of the main route for improving the homogeneity of the circulating slurry.

Said homo- and co-polymerisations can also be carried out in double loop systems consisting of two pipe loop reactors each preferably using the settling legs technology and being connected in series by a transfer line, said systems being also referred to as "bimodal reactors" in the present specification.

The bimodal reactors are quite desirable as they offer the possibility to prepare highly tailored polyolefins by providing different polymerising conditions in each reactor. It is however often difficult to find suitable space to build these double loop reactors as in the current configuration they need to be close to one another in order to insure adequate transfer of growing polymer from one loop to the other. The average velocity of the material circulating in the transfer line is of less than 1 m/s: this line must therefore be very short in order to avoid sedimentation and clogging due to the polymerisation of residual monomers.

There is thus a need to provide improved means. either to connect two existing reactors that may be distant from one another or to build two new reactors that do not need to be close to one another if available space so requires, in order to carry out successfully an olefin slurry polymerisation.

In a bimodal system, pressure is typically controlled by interaction between a set-point value and dumping of the legs. Each time the set-point value is reached one leg is dumped and consequently, pressure drops to a value that is lower than the set-point value: this is essential to maintain control of the pressure. If the pressure drop is not sufficient, there exists a scenario for recovering control. This type of control is necessary for linking leg dumping that is a batchwise process, to polymerisation in a loop reactor that is a continuous process.

In prior art, the conventional way of operating the double loop reactor was to work with a static set-point value and with a static pressure differential. Under such conditions, it is difficult to maintain a constant, pressure differential between the two loop reactors, since the control applies to a mixture of batch discharge and continuous operations.

It is an aim of the present invention to provide control means for connecting two or more loop reactors.

It is also an aim of the present invention to take out of service or re-opening a settling leg without interfering with the operation of the system.

It is another aim of the present invention to decrease the residence time of the material in the line connecting the reactors.

It is yet another aim of the present invention to improve the homogeneity of the flow in the loop reactors.

It is a further aim of the present invention to increase the capacity of the recycle pumps of double loop reactors.

Any one of those aims has been, at least partially, fulfilled by the present invention.

LIST OF FIGURES

Figure 1:
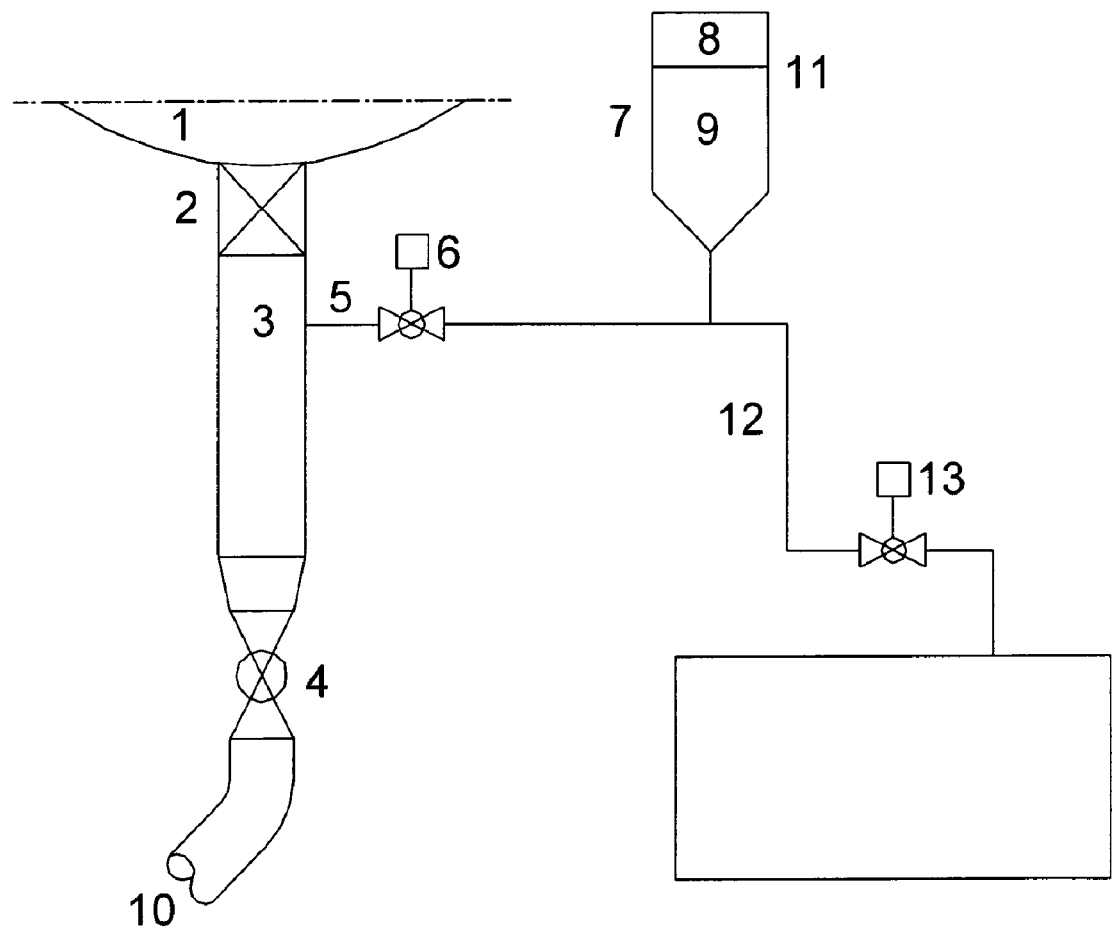
FIG. 1 represents schematically the settling leg unit used in the present invention.

Accordingly, the present invention discloses a slurry loop reactor comprising at least two loops connected in series wherein at least one settling leg unit of a first reactor (1), represented in FIG. 1, is connected to a further reactor by means of a transfer line (10), and wherein the settling leg unit comprises:
- a main valve (2) arranged to admit polymer product into the settling leg;
- a settling leg (3);
- a product take off (PTO) valve (4) connecting the settling leg to the transfer line (10);
- a flushing line (5) arranged to carry flushing fluid into the settling leg and comprising an automatic valve (6) commanded by the position of the main admitting valve (2);
- a pressure vessel (7) comprising a two-phase system of pressurising gas (8) and flushing fluid (9) separated by a flexible membrane (11);
- a flushing fluid input line (12) comprising a pressure regulating valve (13).

In the slurry loop reactor of the present invention that comprises at least two loop reactors connected in series, the line connecting the two loops is subject to a dynamic pressure differential. The set-point value of the second reactor is linked directly to the process value of the first reactor. This dynamic control system is able to link the batchwise dumping process in both reactors to the continuous polymerisation process, thereby maintaining the desired differential pressure at all times.

The settling leg unit of the present invention allows taking out of service and re-opening of a leg without interfering with the operation of the reactor. When the main valve (2), typically a Borsig valve, admitting polymer product into the leg is closed, the flushing sequence begins and lasts for a period of time that is typically. of about 2 minutes. Automatic valve (6) opens and admits the flushing fluid into the settling leg. The flushing fluid, submitted to the pressure of the pressurising gas in the pressure vessel, quickly flows into the settling leg. At the same time, the PTO valve is open and rotates at a speed that is typically of one rotation per second, releasing the polymer product into the transfer line. Regulating pressure valve (13) is then operated to admit more flushing fluid into the flushing line. That additional flushing fluid flows directly to the settling leg if the PTO valve is in open position, meaning that it rotates at a speed of one rotation per second. Typically, the PTO valve remains in operation for about two minutes. When the PTO valve is closed, the settling leg is filled up completely with flushing fluid and the pressure vessel is re-pressurised. That terminates the flushing sequence. Automatic valve (6) remains open when main valve (2) is closed thereby keeping the settling leg under flushing fluid pressure. The settling leg is thus out of service without stopping the operation of the reactor. It can be re-opened when needed again simply by opening main valve (2) associated with automatic shut-off of automatic valve (6). This system is typically used to clean a leg.

Preferably, the pressurisation gas in the pressure vessel is nitrogen. The flushing fluid can be fresh solvent or monomer, preferably, it is recycled solvent or recycled monomer or combination thereof, more preferably, it is recycled solvent.

Figure 2:
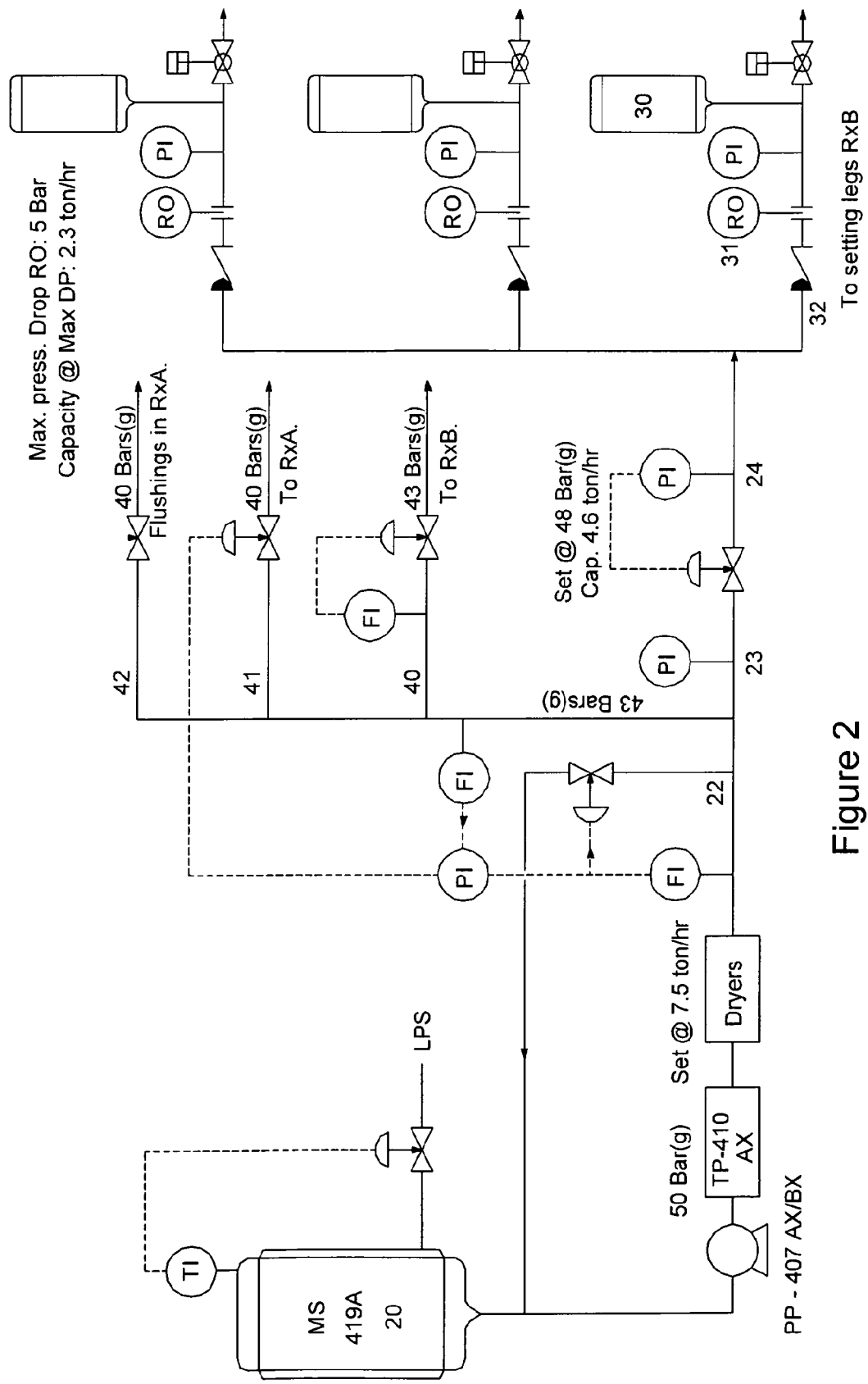
FIG. 2 represents schematically the system used in the present invention to carry the recycling fluid to the pressure control vessel.

In a most preferred embodiment according to the present invention, represented in FIG. 2, the flushing fluid is recycled solvent, preferably, recycled isobutane (iC4).

The automatic pressure valve situated on the flushing line in front of the pressure vessels is opened when the downstream pressure is lower than a given value. It must be opened slowly in order to avoid cavitation of the recycling pump (21) that is necessary when recycling solvent and/or monomer is used.

The recycled solvent, contained in vessel (20) is sent to recirculation pump (21). The solvent flow is regulated by control valve (22) in order to keep the pump flow rate at a constant value typically of about 7.5 tons/h. One part of the solvent is sent to the loop reactors via lines 40, 41 and 42, the other part is sent to the one or more pressure vessel(s) (30) via line 23. Line 23 is equipped with a pressure controller(24) that detects and acts on changes in downstream pressure. On each line (32) sending recycled solvent to its pressure vessel, there is a restriction orifice (31), limiting the maximum rate into said leg in order to protect the system from cavitation in case of a PTO leak.

In the preferred embodiment according to the present invention, the double loop reactor comprises a by-pass line connecting two points of the second loop reactor by an alternate route having a different transit time than that of the main route, said by-pass line also collecting the growing polymer exiting the first loop reactor through the transfer system and sending said growing polymer to the second reactor. The transfer system ideally comprises one or more settling leg, each connected to a transfer line by a product take off (PTO) valve. That system has been described for example in WO06/003144.

Throughout the present description the loops forming the slurry loop reactor are connected in series and each loop can be folded.

Optionally, the lines may be jacketed.

When a by-pass line is used, the velocity of the material circulating in the line connecting the loop reactors, must be sufficient to avoid sedimentation and possibly clogging: it must be of at least 3 m/s.

The present invention may be used with all types of catalyst systems. It can be used for the homo- or co-polymerisation of olefins. The preferred monomers are ethylene and propylene, more preferably ethylene. The preferred comonomers are ethylene, propylene and hexene Suitable diluents are well-known in the art and include hydrocarbons which are inert and liquid under reaction conditions. They include isobutane, propane, n-pentane, i-pentane, neopentane and n-hexane, more preferably isobutane.

The present loop reactor has proven particularly useful for preparing bimodal polyethylene with metallocene catalyst systems.

EXAMPLE

The content of a leg taken out of service and its transfer line representing a total volume of 36 L was replaced by recycled isobutane within 30 seconds. The average flushing rate per leg was thus of 2.3 t/h.

The capacity of the recycle isobutane pump was as follows:
1.8 tons/hr to first reactor;
4.4 tons/hr to second reactor divided into: 1 tons/hr to flushings; 0.4 ton/hr to flushing transfer lines; and 3 tons/hr to reactor
1.3 tons/hr redirected to the recycle pump.

The pressure control (PIC) valve (24) of the flushing line was opened when the downstream pressure was lower than 48 barg. It was opened slowly in order to avoid cavitation of the pump.

Decreasing recirculation to the pump and decreasing the flow to the first and second reactors were used to compensate the sudden increase in flushing rate. The PIC was sized at 4.6 tons/h of iC4 at a pressure of 48 barg as needed for the flushing of 2 legs at the same time.

High pressure variation in the system during the flushing cycle were compensated by the installation of pressure vessels (one per leg) and a slow acting actuator placed on the pressure control valve (PIC) (24). At the beginning of the flushing cycle, the on/off valve on the flushing line of the leg was automatically opened when the Borsig valve admitting polymer product in the settling leg was closed and the pressure decreased in the settling leg when the PTO valve was open and rotated at a speed of one rotation per second. Isobutane from the pressure vessel flowed to the leg while the PIC valve on the isobutane flushing line was slowly opened. When the PIC valve was open, the flow coming from the pump went either to the leg when the PTO valve was open, or to the pressure vessel in order to limit pressure variation at the recirculation pump.

After 2 minutes, flushing was ended by closing the PTO valve.

A restriction orifice (31), placed on the flushing line of each leg, limited the maximum flushing rate to any one leg to 2.3 tons/h at a differential pressure of 7 barg, in order to protect the system from cavitation in case of a PTO leak.

When the flow through the PIC valve exceeded that of the recirculation pump, the flow to the second reactor was interrupted in order to free up flushing capacity. This was sufficient for the flushing of one leg. When two legs were simultaneously flushed, flushing of the transfer lines had to be decreased also to further increase flushing capacity.

Three legs could possibly be closed simultaneously. In that case, it appeared better to isolate the reactor rather then to ensure proper flushing of the settling legs.

The invention claimed is:

1. A slurry loop reactor comprising:
   at least two loops connected in series wherein at least one settling leg unit of a first reactor is connected to a further reactor by means of a transfer line and wherein the settling leg unit comprises:
      a main valve arranged to admit polymer product into the settling leg;
      a settling leg;
      a product take off (PTO) valve connecting the settling leg to the transfer line;
      a flushing line arranged to carry flushing fluid into the settling leg and comprising an automatic valve commanded by the position of a main admitting valve;
      a pressure vessel comprising a two-phase system of pressurising gas and flushing fluid separated by a flexible membrane; and
      a flushing fluid input line comprising a pressure regulating valve.

2. The slurry loop reactor of claim 1, wherein the automatic valve opens automatically when the main admitting valve closes.

3. The slurry loop reactor of claim 1, wherein the flushing fluid is recycled solvent, recycled monomer or a combination thereof.

4. The slurry loop reactor of claim 3, wherein the flushing fluid is recycled isobutane.

5. The slurry loop reactor of claim 1, wherein the pressurising gas is nitrogen.

6. The slurry loop reactor of claim 1, wherein the two loop reactors are linked by a by-pass line connecting two points of the second loop reactor by an alternate route having a different transit time than that of the main route, said by-pass line also collecting the growing polymer exiting the first loop reactor through a transfer system and sending said growing polymer to the second reactor.

* * * * *